(12) United States Patent
Ju

(10) Patent No.: US 7,215,785 B1
(45) Date of Patent: May 8, 2007

(54) PASSIVE SOUND TELEMETRY SYSTEM AND METHOD AND OPERATING TOY USING THE SAME

(76) Inventor: Sang Gyu Ju, Ieongsan Apt. 102-801, 441-2 Ahmsa-dong, Kangdong-ku, Seoul (KR)

( * ) Notice: Subject to any disclaimer, the term of this patent is extended or adjusted under 35 U.S.C. 154(b) by 0 days.

(21) Appl. No.: 10/181,253

(22) PCT Filed: Feb. 3, 2000

(86) PCT No.: PCT/KR00/00085

§ 371 (c)(1),
(2), (4) Date: Jul. 16, 2002

(87) PCT Pub. No.: WO01/57550

PCT Pub. Date: Aug. 9, 2001

(51) Int. Cl.
*G06F 155/00* (2006.01)

(52) U.S. Cl. .......................................... 381/92; 367/125

(58) Field of Classification Search ............ 381/91–92, 381/122; 367/118, 123–125, 127; 73/597, 73/861.21, 861.27–861.28; 374/118, 127; 348/14.01, 14.08
See application file for complete search history.

(56) References Cited

U.S. PATENT DOCUMENTS

| 4,245,430 A | * | 1/1981 | Hoyt ........................... 46/266 |
| 4,480,322 A | * | 10/1984 | Orieux et al. ................ 367/123 |
| 4,622,657 A | * | 11/1986 | Clare .......................... 367/129 |
| 4,717,364 A | * | 1/1988 | Furukawa .................... 446/175 |
| 4,910,719 A | * | 3/1990 | Thubert ....................... 367/125 |
| 5,647,787 A | * | 7/1997 | Raviv et al. ................. 446/175 |
| 5,737,431 A | * | 4/1998 | Brandstein et al. ........... 381/92 |
| 6,130,949 A | * | 10/2000 | Aoki et al. ................. 381/94.3 |
| 6,826,284 B1 | * | 11/2004 | Benesty et al. ............... 381/92 |

* cited by examiner

*Primary Examiner*—Vivian Chin
*Assistant Examiner*—Lun-See Lao
(74) *Attorney, Agent, or Firm*—Rosenberg, Klein & Lee

(57) ABSTRACT

A passive sound telemetry system and method is provided, in which phase differences are calculated for every pulse from acoustic signals received via three or six acoustic receivers, to measure a distance and angle with respect to a sound source. The system is applied to an operating toy giving chase to a user while following the user command. The telemetry system includes first to fourth acoustic receivers (111–114) contained in the housing for receiving first to fourth acoustic signals from a user, first to fourth zero crossing detectors for generating first to fourth pulse signals based on the first to fourth acoustic signals, earliest reception signal detector for detecting a pulse signal having the earliest phase among the first to fourth pulse signals, first to fourth arrival time difference calculator (70) for calculating arrival time differences between the pulse signal of the earliest phase and the first to fourth pulse signals, respectively, thereby obtaining an angle and a distance between the center of acoustic receivers and the user, based on a time difference between the second and third minimum arrival time difference values.

11 Claims, 11 Drawing Sheets

PASSIVE SOUND TELEMETRY SYSTEM AND METHOD AND OPERATING TOY USING THE SAME

TECHNICAL FIELD

The present invention relates to a passive sound telemetry system and method, and more particularly, to a passive sound telemetry system and method in which phase differences are calculated for every pulse from acoustic signals received via three or six acoustic receivers which are arranged in the shape of a tetragon or a symmetrical tetrahedron, to measure a distance and angle with respect to a sound source which is distant two-dimensionally or three-dimensionally in a broad direction, at high speed in real time, and errors of the measured distance and angle are corrected to obtain an accurate position of the sound source.

Further, the present invention relates to an operating toy having an intelligent and interactive function, for recognizing an acoustic generation position as well as a user command using the passive sound telemetry system and method, and performing various command operations while following the user command.

BACKGROUND ART

In general, there are an active method and a passive method as methods for measuring a distance and angle of a target using an acoustic signal. The active method emits a particular sound wave toward a target and measures the time of a reflective wave returning from the target, to thereby calculate a distance and angle with respect to the target. The passive method measures a distance and angle of a sound source relying upon an acoustic signal emitted from the sound source.

Here, as the passive methods, there have been proposed a method for estimating an angle using a number of directional microphones as in Korean patent laid-open publication 90-5252, a method for measuring only an angle using more than two or three sensors as in U.S. Pat. Nos. 3,947,803, 4,245,430, and 4,601,025, and a method for measuring an angle and distance using three or more sensors as in U.S. Pat. Nos. 4,317,186, 4,910,719 and 5,586,086.

First, in view of arrangement of sensors, since a number of sensors are used in matrix in U.S. Pat. No. 4,317,186, and three sensors are aligned in line in U.S. Pat. No. 4,910,719, the distance and angle of the sound source can be measured only within 180 degrees, and since movement of an acoustic source is tracked to calculate a point of generation of an acoustic signal in U.S. Pat. No. 5,586,086, various other problems are revealed.

Then, in view of processing of acoustic signals, an electrical signal of a sound wave received in each channel is rectified and converted into an acoustic energy and then a peak point is detected and an arrival delay time of the waveform detected in each channel is measured, to thereby obtain an angle and distance of the sound source, in U.S. Pat. Nos. 3,947,803, 4,245,430, 4,717,364 and 5,407,376.

Thus, in these measuring methods, a loss and error of time may occur in a rectification process of a sound signal and a peak value detection process. Also, since a high speed measuring for real-time processing does not facilitate, a number of samples cannot be extracted within a short time and thus a correction of a measuring error is limited to thereby lower an accuracy of measurement.

Meanwhile, in view of an operating toy, only a direction of a sound source which generates a sound is recognized in Korean patent laid-open publication 90-5252 and U.S. Pat. No. 4,245,430, so that the operating toy operates in reply to the acoustic signal. Thus, since the operating toy does not recognize a distance from the sound source and may proceed in the direction only for a time of generation of sound, a user should generate a sound continuously in the case that he or she tries to contact the operating toy.

Also, U.S. Pat. Nos. 4,717,364 and 5,647,787 disclose a user command recognition function and an operation for performing the user command. However, they perform an irrelevant operation to a user position.

As described above, the prior art has not proposed a method for obtaining an angle and distance with respect to a sound source in a two-dimensional and/or three-dimensional space at high speed in real time, and correcting a measuring error by using the angle and distance, to thereby not heighten an accuracy of measurement.

Further, the prior art has not proposed an intelligent and interactive operating toy capable of recognizing an angle and distance with respect to a sound source, for example, a user and tracking the user in reply to a call or command of the user, and performing an operation based on the recognized command.

DISCLOSURE OF THE INVENTION

To solve the prior art problems, it is an object of the present invention to provide a passive sound telemetry system and method in which phase differences are calculated for every pulse from acoustic signals received via three or six acoustic receivers which are arranged in the shape of a tetragon or a symmetrical tetrahedron, to measure a distance and angle with respect to a sound source which is distant two-dimensionally or three-dimensionally in a broad direction, at high speed in real time, and errors of the measured distance and angle are corrected to obtain an accurate position of the sound source.

It is another object of the present invention to provide an operating toy having an intelligent and interactive function, for recognizing an acoustic generation position as well as a user command using the passive sound telemetry system and method, and performing various command operations while following the user command.

To accomplish the above object of the present invention, according to a first aspect of the present invention, there is provided a passive sound telemetry system for measuring an angle $\theta$ and a distance R with respect to an acoustic generation source, the passive sound telemetry system comprising: first through third acoustic receivers disposed in three vertices of a square each side of which has a predetermined length L, for receiving first through third acoustic signals having an arrival time difference from the acoustic generation source; first through third zero crossing detectors for converting the first through third acoustic signals into a pulse signal for every period based on a zero electrical potential, to thereby generate first through third pulse signals; earliest reception signal detector means for detecting a pulse signal having the earliest phase among the first through third pulse signals; and first through third arrival time difference calculator means for calculating an arrival time difference $t_0$, $t_1$, $t_2$ between the pulse signal of the earliest phase and the first through third pulse signal, respectively, to thereby obtain an angle and distance between the center of the first through third acoustic receivers and the acoustic generation source, based on a time difference $t_2-t_0$ between the second minimum arrival time difference value $t_2$ and the third minimum arrival time difference value $t_0$.

The passive sound telemetry system operates within 180 degrees on the two-dimensional plane.

According to a second aspect of the present invention, there is provided a passive sound telemetry system for measuring an angle θ and a distance R with respect to an acoustic generation source, the passive sound telemetry system comprising: first through fourth acoustic receivers disposed in each vertex of a square each side of which has a predetermined length L, for receiving first through fourth acoustic signals having an arrival time difference from the acoustic generation source; first through fourth zero crossing detectors for converting the first through fourth acoustic signals into a pulse signal for every period based on a zero electrical potential, to thereby generate first through fourth pulse signals; earliest reception signal detector means for detecting a pulse signal having the earliest phase among the first through fourth pulse signals; and first through fourth arrival time difference calculator means for calculating an arrival time difference $t_0$, $t_1$, $t_2$, $t_3$ between the pulse signal of the earliest phase and the first through fourth pulse signal, respectively, to thereby obtain an angle and distance between the center of the first through fourth acoustic receivers and the acoustic generation source, based on a time difference $t_2-t_0$ between the second minimum arrival time difference value $t_2$ and the third minimum arrival time difference value $t_0$. The passive sound telemetry system of the second aspect is applied to obtain an angle and distance with respect to a sound source over all angles on the two-dimensional plane.

There is also provided a user interactive operating toy using a passive sound telemetry system according to the present invention, the user interactive operating toy comprising: an electric-powered driving mechanism having a directional shift and traveling function by means of a pair of individually driven electric motors; a housing which moves by the electric-powered driving mechanism; a plurality of visually, aurally and physically driven portions which are installed in the exterior of the housing and operate by a control signal; first through fourth acoustic receivers contained in the housing and disposed in each vertex of a square each side of which has a predetermined length L, for receiving first through fourth acoustic signals having an arrival time difference and generated from a user; first through fourth zero crossing detectors for converting the first through fourth acoustic signals into a pulse signal for every period based on a zero electrical potential, to thereby generate first through fourth pulse signals; earliest reception signal detector means for detecting a pulse signal having the earliest phase among the first through fourth pulse signals; first through fourth arrival time difference calculator means for calculating an arrival time difference $t_0$, $t_1$, $t_2$, $t_3$ between the pulse signal of the earliest phase and the first through fourth pulse signal, respectively; sound recognition means for performing sound recognition with respect to the first through fourth sound signals; and a controller for controlling the electric-powered driving mechanism by obtaining an angle θ and a distance R between the center of the first through fourth acoustic receivers and the user, based on a time difference $t_2-t_0$ between the second minimum arrival time difference value $t_2$ and the third minimum arrival time difference value $t_0$, and following a user command based on the sound recognition using the obtained angle θ and distance R.

The earliest reception signal detector means comprises: a first NOR gate for generating a first gate signal which falls in synchronization with a rising edge of the earliest pulse signal among the first through third pulse signals and which rises in synchronization with a falling edge of the latest pulse signal among the first through third pulse signals; interrupt request signal generator means for generating a counting end signal in synchronization with the counting end of the arrival time difference calculator means; a D flip-flop for generating a second gate signal which is set in synchronization with a rising edge of the counting end signal and which is reset in synchronization with a falling edge of the gate signal output from the first NOR gate; an OR gate for generating a trigger signal as a sum signal of the first and second gate signal output from the first NOR gate and the D flip-flop, respectively; and second through fourth NOR gates for generating an enable signal for setting a counting period with respect to the first through third time difference calculator means in response to the first through third pulse signals which are applied to respective input ends and the trigger signal which is commonly input to the other input ends.

Also, the sound recognition means in the operating toy further comprises: a sound pattern memory for registering a user particular sound pattern; and a sound judgment means whether a received sound signal is the registered particular sound signal. The controller is activated only when the registered particular sound signal, to thereby perform the operation of the system.

Meanwhile, there is also provided a passive sound telemetry method for measuring an angle θ and a distance R with respect to an acoustic generation source, the passive sound telemetry method comprising the steps of: receiving first through fourth acoustic signals having an arrival time difference from the acoustic generation source by first through fourth acoustic receivers disposed in each vertex of a square each side of which has a predetermined length L; converting the first through fourth acoustic signals into a pulse signal for every period based on a zero electrical potential, to thereby generate first through fourth pulse signals; detecting a pulse signal having the earliest phase among the first through fourth pulse signals; and calculating an arrival time difference $t_0$, $t_1$, $t_2$, $t_3$ between the pulse signal of the earliest phase and the first through fourth pulse signal, respectively; and obtaining an angle θ and distance R between the center of the first through fourth acoustic receivers and the acoustic generation source, based on a time difference $t_2-t_0$ between the second minimum arrival time difference value $t_2$ and the third minimum arrival time difference value $t_0$.

As described above, the present invention performs calculation of a time difference for every pulse among the sound wave signals of each channel received from three or four sensors disposed in the form of a square on the two-dimensional space, or six sensors disposed in the symmetric tetrahedron form in the three-dimensional space, to thereby enable measurement of the distance and angle with respect to the sound source at a broad direction in real time. Also, a measuring error can be corrected to obtain accurate data by arithmetically averaging the measured values obtained a number of times.

Also, it is possible to set the interval of the microphones within a wavelength of the sound wave to be measured, in the present invention. Accordingly, a measuring system can be implemented in a small space, to thereby enable measuring equipment to be compact.

BEST MODE FOR CARRYING OUT THE INVENTION

Preferred embodiments of the present invention will be described in more detail with reference to the accompanying drawings.

Figure 1:
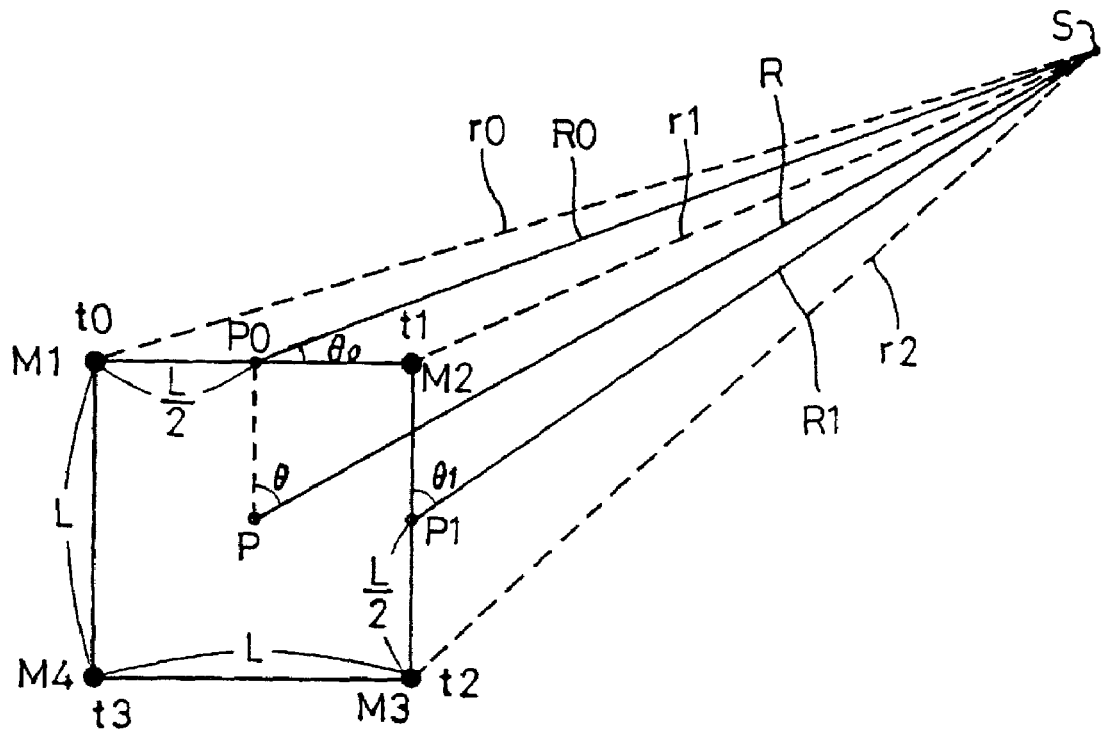
FIG. 1 is a geometric diagram for explaining the principle of a passive sound telemetry according to the present invention in the case that four sensors are disposed on the two-dimensional plane.

First, a passive sound telemetry according to the present invention uses a structure where first through fourth microphones M1–M4 as at least three or preferably four acoustic detection sensors are disposed in a square or tetragon preferably, each side of which has a predetermined length L as shown in FIG. 1, when an angle θ and a distance R with respect to a sound source S over 360 degrees from one spot on the two-dimensional space.

The above disposition of the four first through fourth microphones M1–M4 takes into consideration that the sound wave generated from a sound source S propagates as a substantially circular wave, and thus, an arrival time sequence is determined according to a direction opposing the sound source S in the sound wave reaching the four first through fourth microphones M1–M4, and the sound wave having a relative time difference is received in the first through fourth microphones M1–M4.

Here, it is assumed that the distances from the sound source S to the first through fourth microphones M1–M4 are $r_0$–$r_3$, the times taken when the sound wave reaches the first through fourth microphones M1–M4 are $t_0$–$t_3$, and then a microphone M2 is located on a position capable of receiving the acoustic signal in the earliest way.

In this case, angles $\theta_0$ and $\theta_1$ formed when the sound source S is viewed from the intermediate points P0 and P1 respectively between the microphones M1 and M2 and the microphones M3 and M2 can be obtained by the following equation (1), using the microphones M1 and M3 disposed to the left- and right-hand sides of the microphone M2.

$$\theta_0 = \cos^{-1} \frac{\frac{r_0 - r_1}{2}}{\frac{L}{2}} \qquad (1)$$

In the above equation (1), assuming that the traveling speed of the sound wave is c, the equation (1) is arranged again as shown in the following equation (2).

$$\theta_0 = \cos^{-1} \frac{c(t_0 - t_1)}{L} \qquad (2)$$

In the same manner as the equation (2), the angle $\theta_1$ is obtained as in the following equation (3).

$$\theta_1 = \cos^{-1} \frac{c(t_2 - t_1)}{L} \qquad (3)$$

In the similar manner to the above, the angle θ formed when the sound source S is viewed in the forward direction from the center P of the four first through fourth microphones M1–M4 is obtained as in the following equation (4).

$$\theta = \sin^{-1} \frac{c(t_2 - t_0)}{\sqrt{2}\, L} + 45° \qquad (4)$$

Meanwhile, assuming that a distance between the center P and the sound source S is R, the following relational equation (1') is established according to the sine rule.

$$\frac{R}{\sin(\theta_0 + 90°)} = \frac{\frac{L}{2}}{\sin(180° - (\theta_0 + 90°) - \theta)}, \qquad (1')$$

Arranging the above relational equation (1') with respect to the distance R, the following equation (5) is obtained.

$$R = \frac{L \sin(\theta_0 + 90°)}{2 \sin(90° - \theta_0 - \theta)} \qquad (5)$$

When the time difference $t_2$–$t_0$ taken when the sound wave reaches the microphones M3 and M1 in the above equation (4) is obtained, the angle θ can be obtained from the equation (4). In the similar manner, the time difference $t_0$–$t_1$ is obtained, the angle $\theta_0$ can be obtained from the equation (2), and then the obtained angle $\theta_0$ is substituted in the equation (5), to thereby obtain the distance R.

Meanwhile, the distances R0 and R1 from the points P0 and P1 to the sound source S in FIG. 1 are obtained as in the following equations (6) and (7), $$R0 = \frac{L \sin(45° + \theta_1)}{\sqrt{2} \sin(90° - \theta_0 - \theta_1)} \qquad (6)$$

$$R1 = \frac{L\sin(45° + \theta_0)}{\sqrt{2}\sin(90° - \theta_0 - \theta_1)} \quad (7)$$

In the present invention, when the angle $\theta_0$ or $\theta_1$ becomes 135 degrees in the equations (6) and (7) and the denominator is zero, a corresponding distance can be obtained using the arrangement of the microphones M1, M3 and M4 or the microphones M1, M2 and M4, to thereby enable the angle and distance to be calculated over 360 degrees on the two-dimensional space.

Figure 2A:
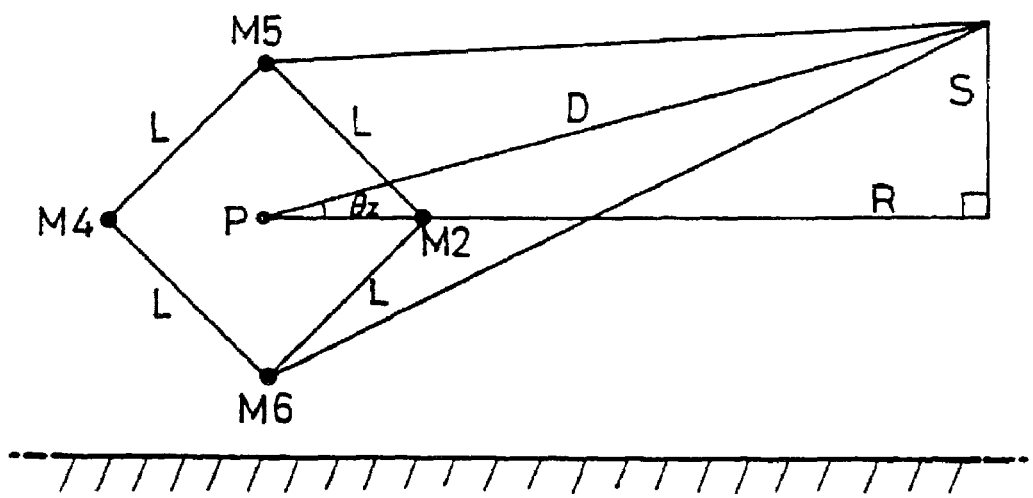
FIG. 2A is a geometric diagram for explaining the principle of a passive sound telemetry according to the present invention in the two-dimensional plane.
Figure 2B:
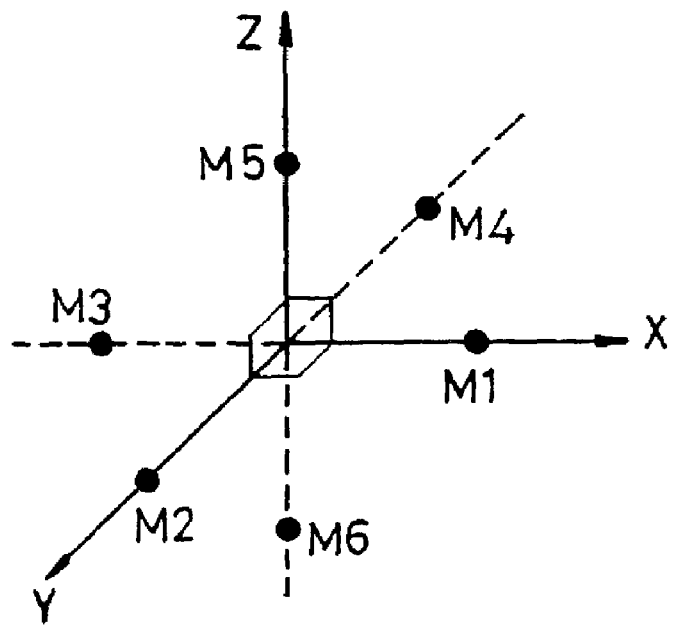
FIG. 2B shows the disposed positions of the sensors shown in FIG. 2A in the three-dimensional perpendicular coordinate.
Figure 2C:
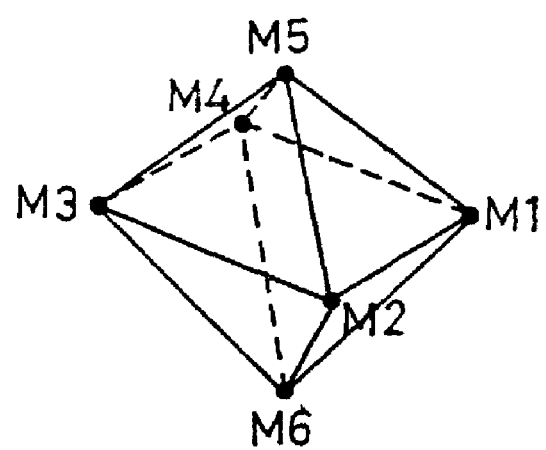
FIG. 2C shows a shape made by the sensors shown in FIG. 2B.

Meanwhile, in order to measure the acoustic generation position, that is, the sound source S in the three-dimensional space, six microphones M1–M6 are arranged as acoustic sensors in each vertex of the symmetric tetrahedron as shown in FIGS. 2A through 2C.

In the above three-dimensional disposition structure, four microphones are disposed in each of the x-y plane formed of first through fourth microphones M1–M4, the y-z plane formed of the microphones M2, and M4–M6, and the z-x plane using the microphones M1, M3, M5 and M6. Thus, if the acoustic generation position is calculated in the same manner as that in the two-dimensional space for each plane and then the crossing-sectional point of the three-dimensional coordinate is obtained, the acoustic generation position S can be measured in the three-dimensional coordinate.

For example, in the case of FIG. 2A, the angle $\theta_z$ with respect to the x-y horizontal plane is obtained according to the equation (4) as in the following equation (8).

$$\theta_z = \sin^{-1}\frac{c(t_5 - t_4)}{\sqrt{2}L} \quad (8)$$

Also, the actual distance D in the three-dimensional space can be obtained by the above equations (2) through (7). In much simpler manner, the actual distance D can be obtained by the following equation (9), using the distance R on the plane obtained in advance by the equation (5).

$$D = \frac{R}{(\cos\theta_z)} \quad (9)$$

In order to obtain the angle $\theta$ and distance R with respect to the sound source S in the two-dimensional space and the three-dimensional space based on the above equations (8) and (9), it becomes necessary to obtain the time difference taken when the sound wave reaches each of the microphones M1–M6.

Figure 3A:
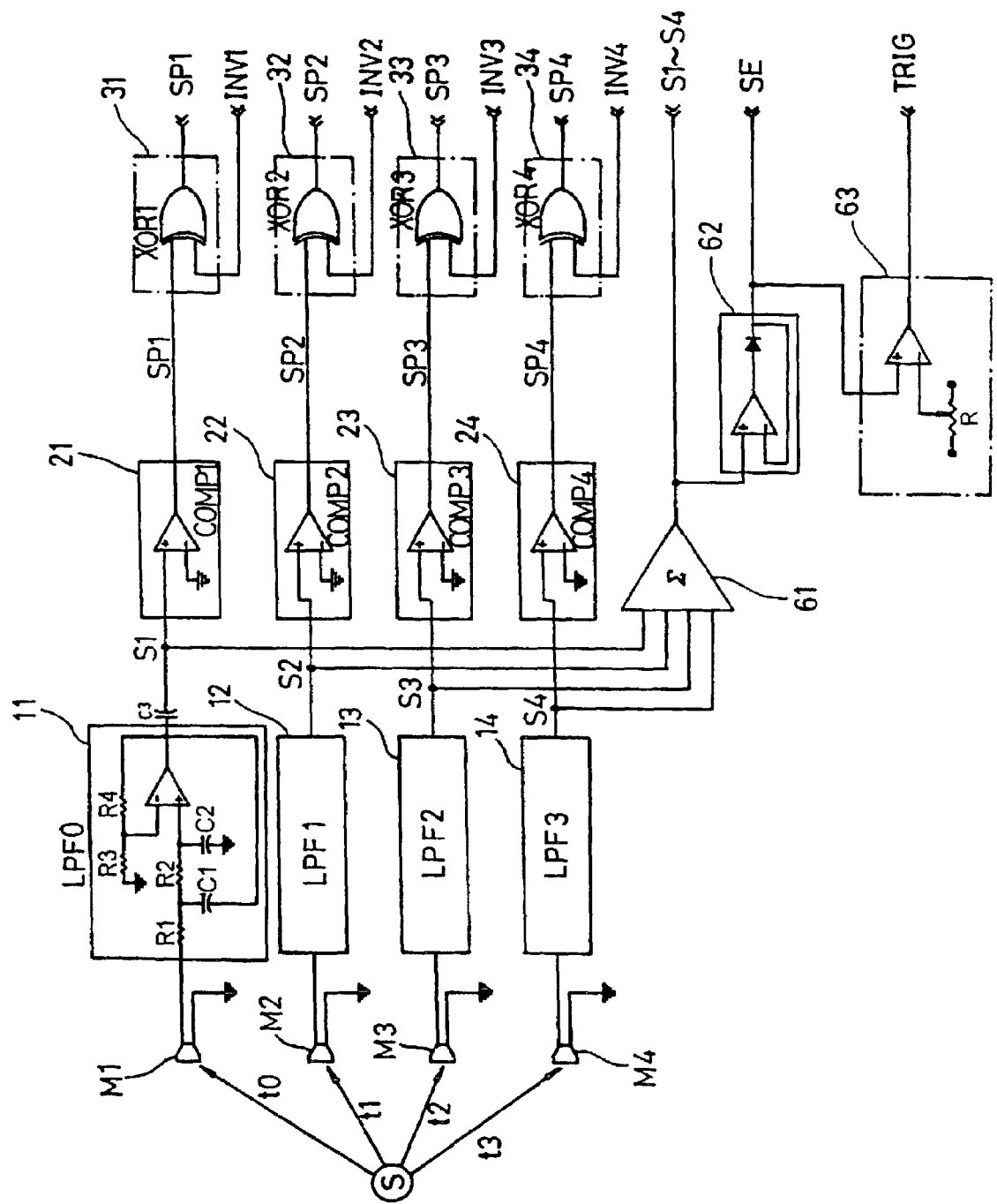
FIGS. 3A and 3B are circuitry diagrams showing the structure of a passive sound telemetry system according to the present invention, respectively.
Figure 3B:
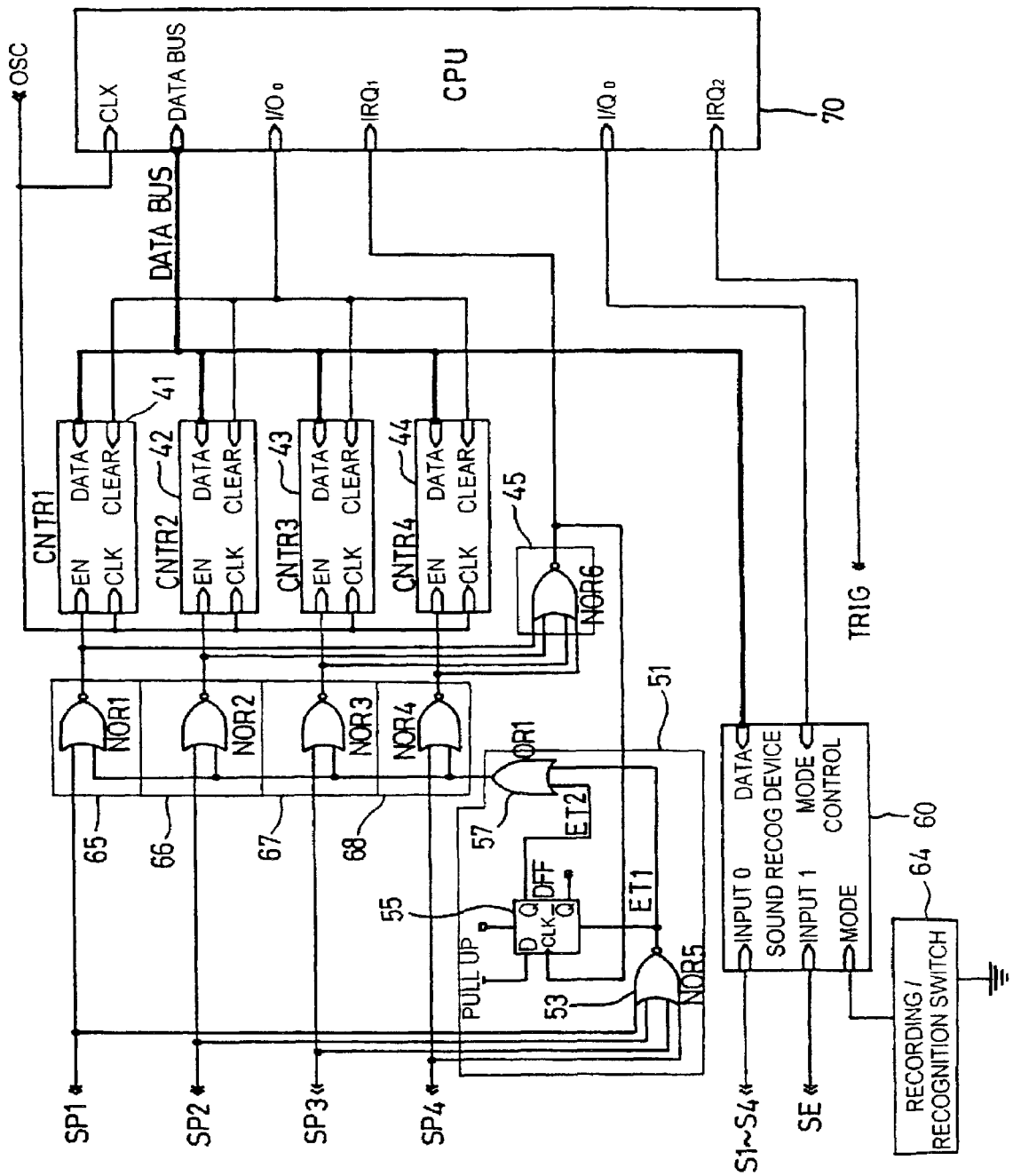

Referring to FIGS. 3A and 3B, the passive sound telemetry system according to the present invention will be described in more detail, in order to obtain the angle $\theta$ and distance R with respect to the sound source S in the two-dimensional space by obtaining the time difference taken when the sound wave reaches each microphone.

In this embodiment, the structure of using the four acoustic sensing microphones will be described, in which four acoustic signals received via each microphone are processed by a signal processor of four channels CH1–CH4 having the same structure. A time different between a microphone which receives the earliest sound wave and another microphone which receives the following sound wave is obtained, to accordingly obtain an angle and a distance. Thus, the present invention increases the number of channels in correspondence to the case that an acoustic sensing microphone is added as necessary.

As the acoustic detection sensors, the four first through fourth microphones M1–M4 are disposed in the form shown in FIG. 1. First through fourth low-pass filters (LPF0–LPF3) 11–14 for amplifying finite acoustic signals S1–S4 received via the first through fourth microphones M1–M4 and filtering high-frequency noise more than an audible frequency are connected to each output end of the first through fourth microphones M1–M4.

In each of the low-pass filters 11–14, it is preferable that two RC combination circuits R1 and C1; and R2 and C2 are connected to the non-inverted input end of an operational amplifier OP AMP for amplifying and low-pass-filtering the received acoustic signals S1–S4, and a secondary active low-pass filter formed of resistors R3 and R4 is connected to the inverted input end of the operational amplifier OP AMP.

Four zero crossing detectors 21–24 having a conversion function for converting the input acoustic signals S1–S4 into the pulse signals SP1–SP4 after removing high frequency noise based on the point passing through a zero electric potential via a DC filtering capacitor C3 are connected to a respective output end of the first through fourth low-pass filters 11–14. The inverted input ends of the respective zero crossing detectors 21–24 are grounded. Accordingly, the zero crossing detectors 21–24 function as comparators for comparing whether the signals input to the non-inverted input ends of the comparators are larger than a zero electric potential.

The pulse signals SP1–SP4 generated from the output end of the respective zero crossing detectors 21–24 are applied to four XOR gates (XOR1–XOR4) 31–34 together with respective channel inverted signals INV1–INV4 applied from a microprocessor CPU 70 which will be described later. When the inverted signals INV1–INV4 are applied to the first through fourth XOR gates 31–34, the phases of the pulse signals SP1–SP4 are inverted.

It is necessary that the polarities of the electrical signals become the same phases with respect to the same acoustic signal. However, in the case that wiring polarities of the first through fourth microphones M1–M4 become opposite, the phases of the acoustic signals S1–S4 received in the first through fourth microphones M1–M4 of each channel can be inverted. Thus, in this case, the CPU 70 judges whether the wiring polarities of the first through fourth microphones M1–M4 become opposite, and supplies the inverted signals INV1–INV4 selectively to the first through fourth phase inverted circuit 31–34 by each channel, to thereby generate the phase inverted pulse signals SP1–SP4.

Meanwhile, the pulse signals SP1–SP4 which have been converted into the pulses by the first through fourth microphones M1–M4, that is, by each channel are applied to first through fourth counters (CNTR1–CNTR4) 41–44. In this case, to obtain the time difference taken when an acoustic signal reaches each microphone by the counters 4144, a counter driving trigger signal TRG is made based on the pulse signal SP2 of the microphone in which the acoustic signal reached in the earliest way, that is, the channel for generating the earliest output (in this embodiment, the second channel CH2). Then, until the pulse output of a corresponding channel CH1, CH3 or CH4 is input, a clock signal CLK having a reference frequency is counted.

The counter driving trigger signal TRG is generated by a trigger signal generator 51. The trigger signal generator 51 includes a NOR gate (NOR5) 53 for receiving the pulse signal SP1–SP4 of each channel, and generating a gate signal ET1 for falling in synchronization with the rising edge of the earliest pulse signal SP2 and rising in synchronization with the falling edge of the latest pulse signal SP4, a D flip-flop 55 for generating a gate signal ET2 which is set in synchronization with the rising edge of an interrupt request signal IRQ and is reset in synchronization with the falling edge of the output ET1 of the NOR gate 53, when the interrupt request signal IRQ with respect to the CPU 70 according to the counter termination which will be described later is applied to a clock terminal, and an OR gate (OR1) 57 for generating the trigger signal TRG as a sum signal of the gate signals ET1 and ET2 of the NOR gate 53 and the D flip-flop 55.

The trigger signal TRG is applied to the different input ends of four NOR gates (NOR1–NOR4) 65–68 in which the pulse signals SP1–SP4 of each of the channels CH1–CH4 are applied. Accordingly, the NOR gates 65–68 generate enable signals EN1–EN4 for setting a counting period of each of the first through fourth counters 4144 and apply the generated enable signals to the enable ends of the first through fourth counters 4144.

The first through fourth counters 4144 count the clock signal CLK for a time when the enable signals EN1–EN4 are applied. Using the counted result, when the interrupt generator 45 applies the interrupt request signal IRQ to the CPU 70, the CPU 70 reads the counted value via a data bus DATA BUS and then generates a clear signal to initialize the first through fourth counters 4144.

The interrupt generator 45 includes a NOR gate NOR6 for receiving a counting period setting enable signal EN1–EN4 output from the NOR gates 65–68, and generating a phase inverted pulse signal of the longest enable signal EN4 as an interrupt request signal IRQ.

Figure 5:
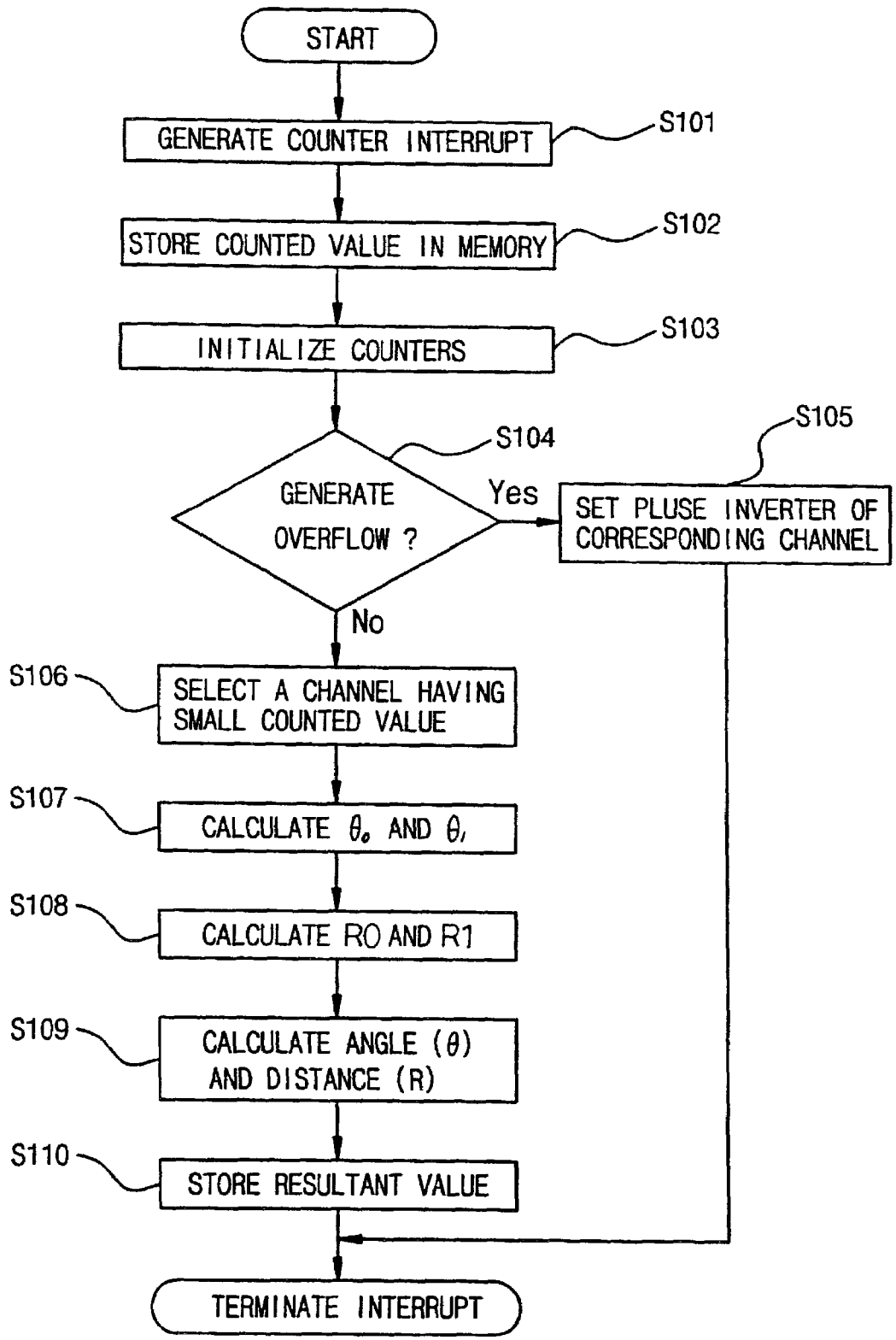
FIG. 5 is a flowchart for explaining a passive sound telemetry method according to the present invention.
Figure 8A:
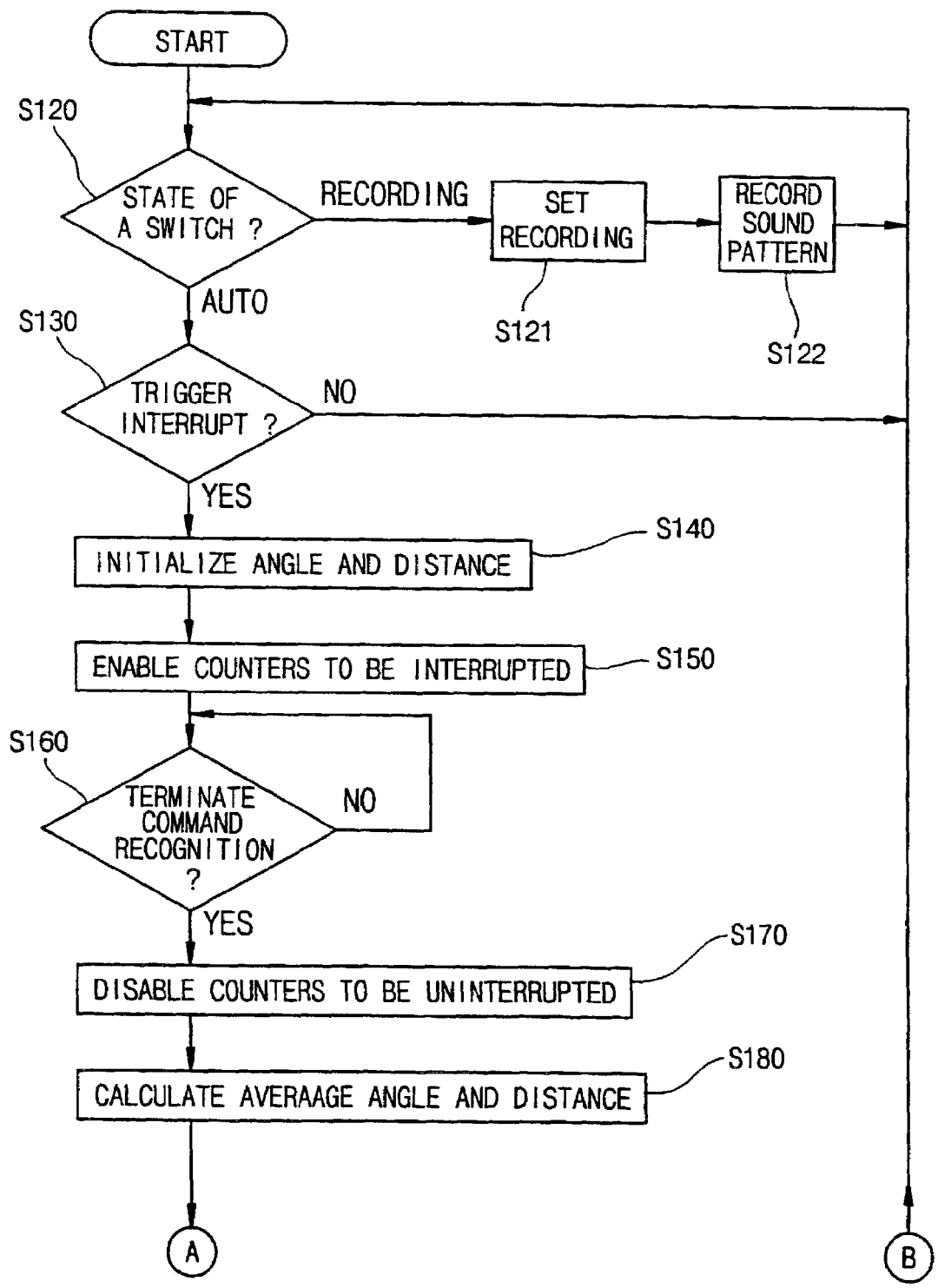
FIGS. 8A and 8B are a control flowchart for explaining the entire operation of the driving circuit of an animal operating toy.
Figure 8B:
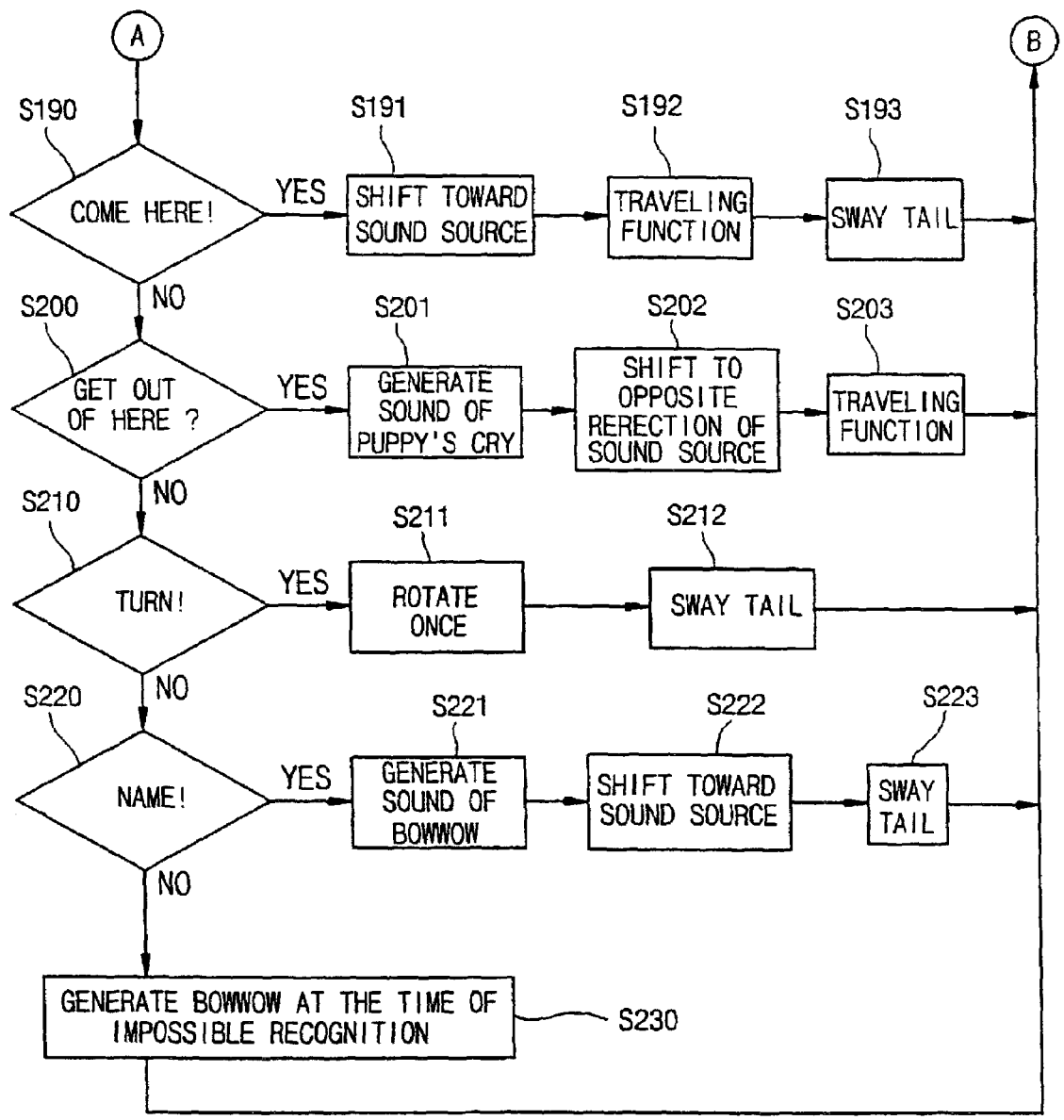

Meanwhile, the CPU 70 includes a programmable memory for storing a system controlling program shown in FIGS. 5, 8A and 8B, and various variables, and a data memory for storing temporary data under processing, for example, a counted value, to thereby calculate an angle and distance with respect to a sound source according to the system controlling program.

The process of obtaining the angle θ and the distance R with respect to the sound source S in the two-dimensional space by the passive sound telemetry system according to the present invention having the above construction will be described in more detail with reference to FIGS. 4 and 5.

First, the sound wave generated in the sound source S is received via the first through fourth microphones M1–M4 which are the acoustic detection sensors, while having a time difference mutually. The finite acoustic signals S1–S4 (referring to "a" through "d" of FIG. 4) received via the first through fourth microphones M1–M4 are amplified at a predetermined amplification factor in the first through fourth low-pass filters 11–14. At the same time, the high frequency noise above the audible frequency is filtered from the received acoustic signals.

Thereafter, the respective outputs of the first through fourth low-pass filters 11–14 are applied to the first through fourth zero crossing detectors 21–24. Then, the input acoustic signals S1–S4 are converted into the pulse signals SP1–SP4 on the basis of the point passing through the zero electric potential, as shown "e" through "h" of FIG. 4, and then the converted results are output.

Figure 4:
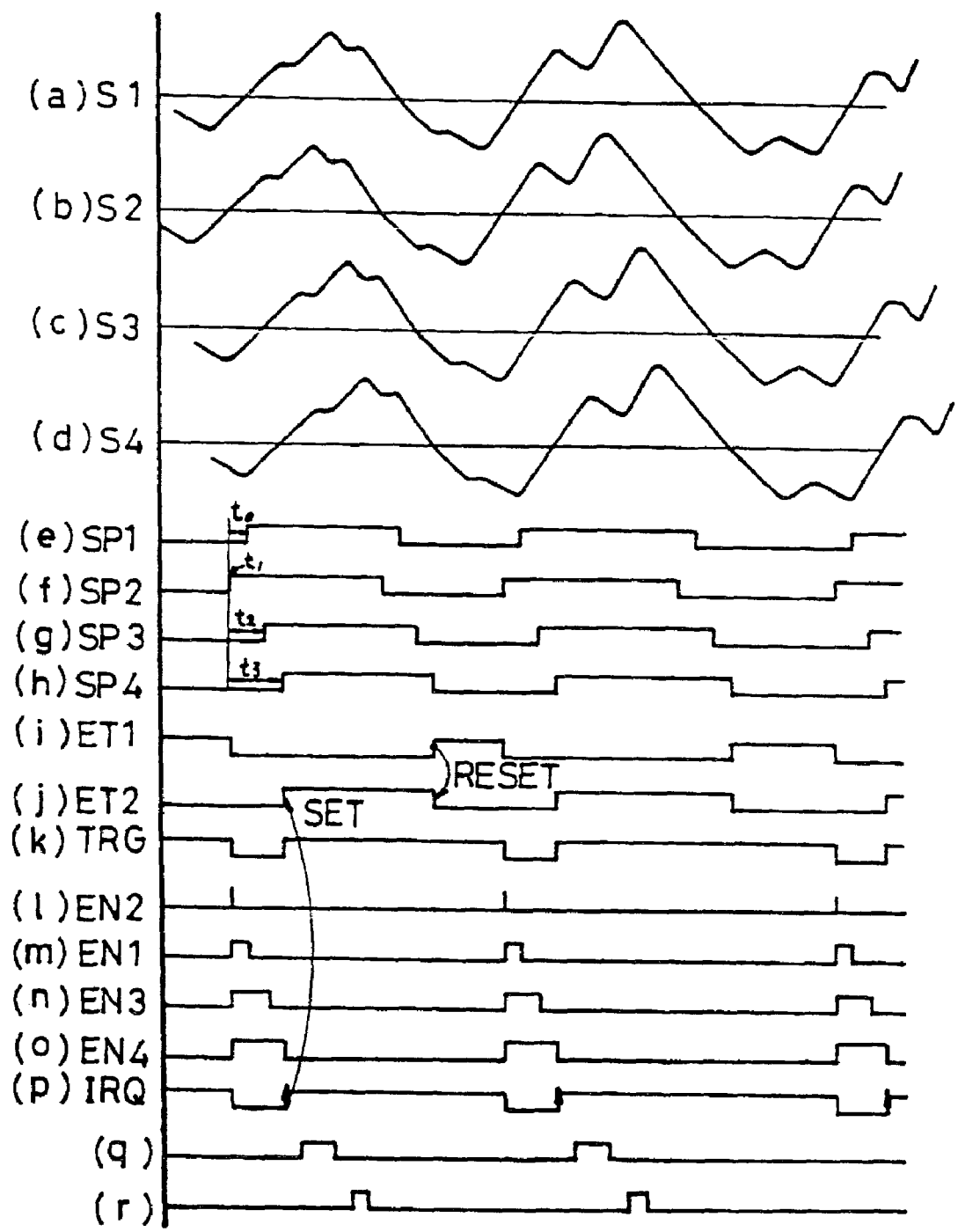
FIG. 4 is a timing diagram showing signal waveforms of essential portions for explaining the function of the passive sound telemetry system according to the present invention shown in FIGS. 3A and 3B.

Here, it is noted that each channel signal of the zero crossing detectors 21–24 is converted into a pulse for every period of the acoustic signals S1–S4 as shown in FIG. 4. Accordingly, the present invention can extract many samples for a short time and at a much higher speed, to thereby heighten an accuracy of measurement, when compared with the conventional method in which a received signal is rectified and then a peak pint of the acoustic energy is found via an integrator in the conventional system.

Thereafter, the pulse signals SP1–SP4 generated from the output ends of the zero crossing detectors 21–24 are applied to each one end of the first through fourth phase inversion circuits 31–34. Here, the CPU 70 judges whether the phase inversion of the acoustic signal occurs due to the fact that the wiring polarities of the microphones M1–M4 become opposite by judging whether an overflow occurs in a corresponding channel. If an overflow occurs in a certain channel, the inverted signals INV1–INV4 for inverting the phases of the corresponding pulse signals are applied to a respectively different input of the corresponding one of the first through fourth phase inversion circuits 31–34.

Thus, the phase of the output of the channel to which the inverted signal of high-level H is inverted and output. The output of the channel to which the inverted signal is not applied is applied to each one end of the NOR gates 65–68 at the state where the phase inversion did not occur.

Meanwhile, the pulse signals SP1–SP4 which have been converted into the pulse signal by each channel are applied to the NOR gate 53 of the trigger signal generator 51. The trigger signal generator 51 generates a gate signal ET1 for falling in synchronization with the rising edge of the earliest pulse signal SP2 and rising I synchronization with the falling edge of the latest pulse signal SP4 as shown as "i" of FIG. 4. The gate signal ET1 is supplied to the rest terminal of the D flip-flop 55.

Also, a pull-up voltage of high level H is applied to the data input end of the D flip-flop 55, and the interrupt request signal IRQ with respect to the CPU 70 according to the counting termination is applied to the clock terminal. Accordingly, the D flip-flop 55 generates a gate signal ET2 which is set in synchronization with the rising edge of the interrupt request signal IRQ and is reset in synchronization with the falling edge of the output ET1 of the NOR gate 53.

Thereafter, the gate signals ET1 and ET2 of the NOR gate 53 and the D flip-flop 55 are summed by the OR gate 57. The summed signal is supplied commonly to the other inputs of the NOR gates 65–68 as a trigger signal TRG (referring to "k" of FIG. 4) which enables the counters 41–44 to count the time differences between the acoustic signal which reaches a certain microphone in the earliest way and that which reaches a different microphone in the subsequent way.

The NOR gates 65–68 sum the trigger signal TRG and the pulse signals SP1–SP4, respectively, and generate the inverted signals of the pulse signals SP1–SP4. The NOR gates 65–68 generate the enable signals EN1–EN4 (referring to "l" through "o" of FIG. 4) for setting a counting period of each of the first through fourth counters 41–44, and apply the generated result to the enable input ends of the first through fourth counters 41–44.

Accordingly, the first through fourth counters 4144 count the clock signal CLK for a period during which the enable signals EN1–EN4 □□are input. At the same time, the interrupt generator 45 receives the enable signals EN1–EN4 and generates the phase inverted pulse signal of the longest enable signal EN4 as an interrupt request signal IRQ (referring to "p" of FIG. 4), and applies the interrupt request signal IRQ to the CPU 7. Thereafter, when the interrupt generator 45 applies the counter interrupt request signal IR! Is applied to the CPU 70 (step S101 of FIG. 5), the CPU 70 reads the counted value via the data bus DATA BUS and stores the read value on the data memory (S102), to then generate a clear signal (referring to "r" of FIG. 4) and initialize the first through fourth counters 41–44 (S103).

Then, the CPU 70 checks the counted value of each channel stored in the data memory to judge whether an overflow channel occurs (S104). If an overflow channel occurred, it is judged that the phase of the received acoustic signal has been inverted. The CPU 70 applies the inverted signals INV1–INV4 to a corresponding channel phase inversion circuits 31–34 (S105), in such a result that an accurate time difference with respect to the other received signal can be obtained at an accurate phase at the time of signal processing of the following received acoustic signal.

Meanwhile, if an overflow channel does not occur in the result of judgment (S104), a channel having the smallest counted value among the counted values read from the four channels is selected (S106).

The counted value of the second channel CH2 for example is the smallest in the result of selection, and thus the time difference $t_0$–$t_1$ taken when the sound wave reaches between the microphones M2 and M1 on the basis of the counted value of the second channel is obtained as the counted value of the first channel CH1. Thus, if the time difference value is substituted in the equation (2), since the length L is a known value, the angle $\theta_0$ in which the sound source S is viewed from the intermediate point P0 between the microphones M1 and M2 can be obtained from the equation (2) (S107).

In the same manner, since the time difference $t_2$–$t_1$ between the microphones M2 and M3 is obtained as a counted value of the third channel CH3, the angle $\theta_1$ in which the sound source S is viewed from the intermediate point P1 between the microphones M2 and M3 is obtained from the equation (3). Using the time difference value.

The angles $\theta_0$ and $\theta_1$ calculated from the step S107 are substituted in the equations (6) and (7), to thereby obtain the distances R0 and R1 from the intermediate points P0 and P1 to the sound source S (S108).

Then, the angle $\theta$ in which the sound source S is viewed in the forwarding direction from the center P of the first through fourth microphones M1–M4, is obtained by using the second and third lowest counted values except for the lowest counted value of the reference microphone M2, that is, by using the difference value between the counted values which becomes the time difference value $t_2$–$t_0$ between the microphones M1 and M3.

Thus, using the time difference $t_2$–$t_0$, the angle $\theta$ can be obtained from the equation (4). Also, if the angle $\theta_0$ obtained in step S107 is substituted in the equation (5), the distance R from the center point P to the sound source S can be obtained (S109).

Then, the resultant value obtained in steps S107–S109 is stored in the data memory (S110), and then a counter interrupt is terminated.

In the same manner, the following received acoustic signal is signal-processed for every period to obtain data about an angle and a distance, thereby enhancing an accuracy of measurement very high.

Further, the number of microphones is increased and the microphones are disclosed in the three-dimensional plane as shown in FIG. 2C. At the same time, the channels for processing the increased received signals are added in parallel as many as the number of the increased microphones. Accordingly, a three-dimensional passive sound telemetry system can be embodied easily.

Also, in order to prevent the system from operating due to the peripheral noise as shown in FIGS. 3A and 3B, the present invention can be constructed so that it operates only when an acoustic energy of a predetermined level is detected.

That is, in FIG. 3A, all the outputs of the first through fourth low-pass filters 11–14 pass through the DC filtering capacitor C3 and then the acoustic signals S1–S4 are summed by a summer 61. Then, the acoustic energy SE of the received acoustic signal is obtained by rectifying the summed acoustic signals S1–S4 by a waveform rectifier 62.

Thereafter, it is judged whether the acoustic energy SE is more than a reference level using a level trigger circuit 63 including a comparator. If the acoustic energy SE is above the reference level, a level trigger signal TRIG is generated from the output of the level trigger circuit 63 to then be applied to the input of the CPU 70. In this case, the CPU 70 activates the system only when the level trigger signal TRIG is input.

Further, it is also possible to add a sound recognition device 60 which will be described below, to thereby record a user sound patter, and then enable the system to be reacted only to the user sound.

Meanwhile, the present invention can constitute an operating toy having an intelligent and interactive function, using the above passive sound telemetry system and method, in which an acoustic generation position can be recognized and simultaneously various commands supplied from the sound source S, for example, a user can be recognized, such that the operating toy can follow the user's voice and perform various command operations.

For this purpose, the acoustic signals S1–S4 summed by the summer 61 and the acoustic energy SE of the acoustic signal are applied to the sound recognition device 60 which is implemented by a well-known sound recognition chip as shown in FIGS. 3A and 3B, to thereby generate sound recognition data with respect to the received acoustic signal using the output of the sound recognition device 60 to then be applied to the CPU 70 via the data bus DATA BUS.

Here, it is also possible to construct the sound recognition device 60 having a sound pattern memory for storing a user sound pattern in advance. In this case, when the system operates, the sound pattern of the input sound signal is detected. The detected pattern is recognized as a user voice only if the detected sound pattern is consistent with the pre-recorded user sound pattern, so that the operating toy reacts only to the user.

Figure 6:
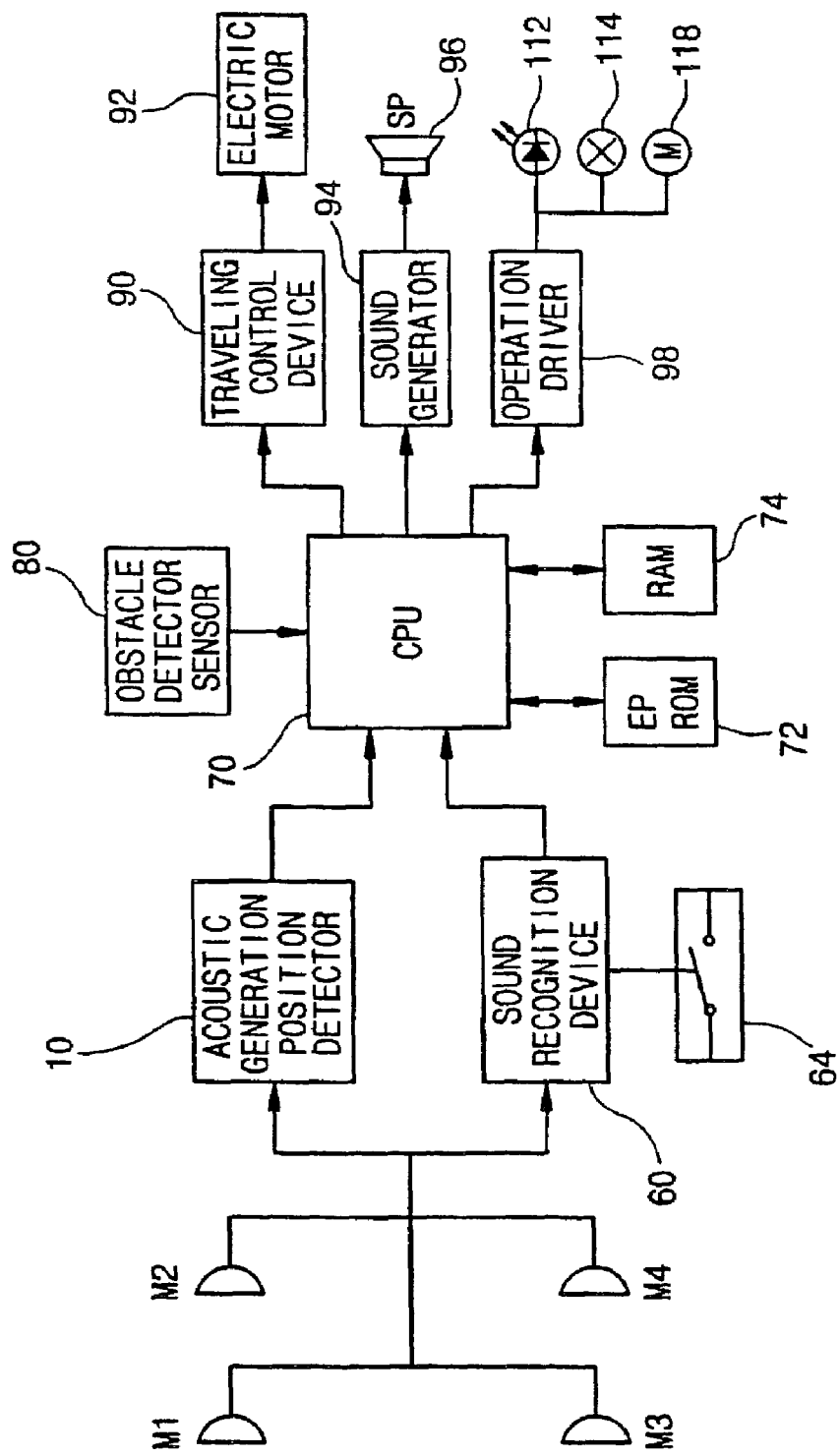
FIG. 6 is a schematic block diagram showing a driving circuit of an operating toy using a passive sound telemetry system according to the present invention.

Meanwhile, FIG. 6 shows the driving circuit of the operating toy using the passive sound telemetry system according to the present invention.

The driving circuit of the operating toy according to the present invention includes at least four microphones M1–M4, an acoustic generation position detector 10 for measuring an acoustic generation position such as a direction and a distance from the acoustic signal received via the microphones M1–M4, and a sound pattern memory storing a sound pattern of a user voice, which constitutes the passive sound telemetry system. The driving circuit of the operating toy also includes a sound recognition device 60 having a function of recognizing the received sound signal, a function of judging a user voice, and a sound synthesizing function, a programmable memory (EPROM) 72 storing a system controlling program, various variables and various melodies, and animal cry or sound, a data memory 74 storing temporary data under process, and a microprocessor (CPU) 70 for calculating an angle $\theta$ and a distance R with respect to the sound source based on the received detected data from the acoustic generation position detector 10 according to the system controlling program, and generating a control signal for performing a user command according to the recognized sound signal in the sound recognition device 60.

Also, the driving circuit of the operating toy further includes an obstacle detector 80 which is installed in front of the toy at least, to the input side of the CPU 70. To the output side of the CPU 70 are connected a traveling control device 90 for controlling driving of a or pair of traveling electric motors (M1) 92, a sound generator 94 for synthesizing sound and melody according to various types of sound data which are stored in the EPROM 72 in advance and then driving a speaker 96, to thereby generate sound, and an operation driver 98 or a warning lamp 114 for driving an electric bulb 112 for performing various lighting functions or an action motor 118 for performing a toy operation of an animal-like toy.

Figure 7:
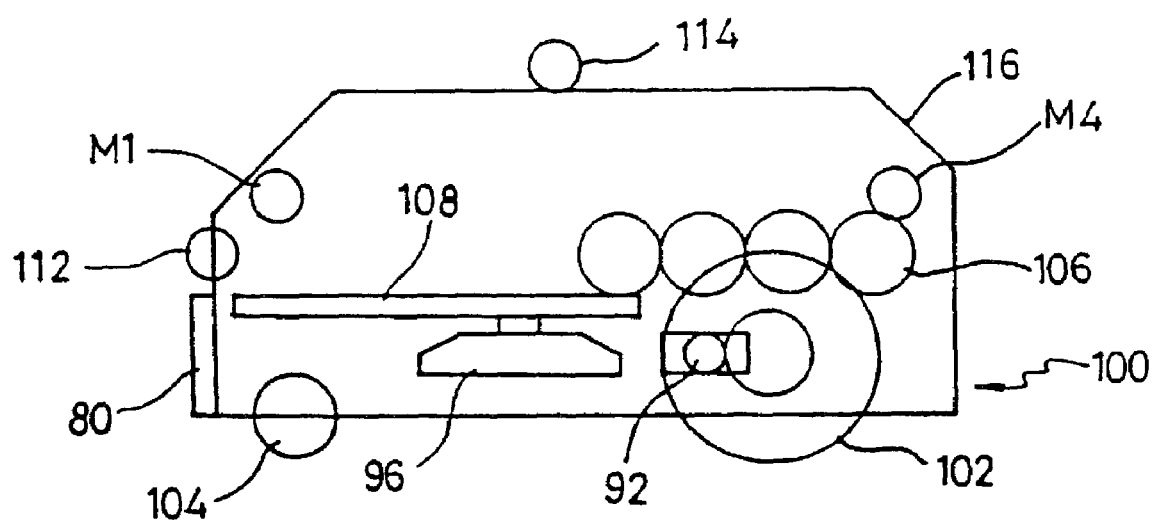
FIG. 7 shows a schematic structure of am automobile operating toy which is driven by the driving circuit shown in FIG. 6.

Meanwhile, FIG. 7 shows a schematic structure of an automobile operating toy which is driven by the driving circuit shown in FIG. 6.

As shown in FIG. 7, in the operating toy which can be used in the present invention, the first through fourth microphones M1–M4 are disposed to the left and right of the front side of the housing 116 of the operating toy 100 and those of the rear side thereof as four acoustic detection sensors. The operating toy include at least a pair of driving wheels 102 and a pair of steering wheels 104 which are driven by one or pair of electric motors 92. During the time when the operating toy 100 proceeds or forwards or backwards, the steering wheel 104 is used to shift a direction to move to a target position.

Otherwise, the operating toy also includes at least one or more pairs of driving wheels 102 and a balance maintenance auxiliary wheel according to a well-known method, in such a manner that the rotational speed with respect to the pair of electric motors 92 differs from each other or equals to each other, and accordingly the rotational speed of the pair of driving wheels 102 differs from each other or equals to each other. As a result, it is possible to perform a front/rear driving and a direction shift is possible. It is also possible to make the operating toy rotate in its place by rotating a pair of driving wheels 102 reverse to each other.

Also, a printed circuit board (PCB) 108 in which various electronic components necessary for operating the operating toy, the speaker 96 and a battery 106 supplying power are contained in the housing 116.

Also, an optical or contact type obstacle detector 80 is installed in front of the housing 116. Accordingly, if an obstacle is detected during traveling, a detour function can be performed. If an obstacle is found in the proximity of a target place, a movement is completed or a backward direction shift function is performed. The warning lamp 114 is installed on top of the housing 116. The electric bulb 112 having a lighting function is installed in the front end of the housing 116.

The operating toy 100 illustrates a toy of a police car or an automobile having an ambulance function. The operating toy can be applied as an animal-like operating toy by adding a tail capable of performing a particular action by an electric motor to the rear end of the operating toy 100, and simultaneously modifying an external shape. Also, the present invention can be applied to an animal-like operating toy which moves using two or four feet.

Referring to FIGS. 6 through 9, the function of the operating toy using the passive sound telemetry system according to the present invention will be described in more detail.

A control flowchart shown in FIGS. 8A and 8B illustrates an example of a control method which can be applied to an animal-like operating toy, particularly, a puppy. However, it is apparent to a person skilled in the art that the present invention can be applied to a different kind of animal-like operating toy, so as to be embodied to represent inborn characteristics of a corresponding animal.

First, a user judges whether a mode set switch 64 in the sound recognition device 60 is in a recording mode or an automatic recognition mode (S120).

In the case that the mode set switch 64 is set to a recording mode in the result of judgment, a user sound pattern is extracted from the user input sound and the extracted sound pattern is recorded in a sound pattern memory in the sound recognition device 60 (S121 and S122).

However, in the case that the mode set switch 64 is set to a recognition mode in the result of judgment, the CPU 70 judges whether the acoustic energy SE detected based on the acoustic signal received via the microphones M1–M4 is above a predetermined level not peripheral noise in the sound level trigger circuit 63 in the case that there is a user call as described in the passive sound telemetry system shown in FIGS. 3A and 3B (S130).

In the case that an acoustic energy above a predetermined level is not detected in the result of judgment, a level trigger signal TRIG is not generated from the output from the level trigger circuit 63. Accordingly, an interrupt signal is not applied to the CPU 70. In this case, the system does not operate, returns to the starting step, and awaits a user call above a predetermined level.

Meanwhile, in the case that an acoustic energy above the predetermined level is detected in the result of judgment, a level trigger signal TRIG is generated from the output from the level trigger circuit 63. Accordingly, an interrupt signal is applied to the CPU 70. Then, the CPU 70 may supply a control signal to the sound recognition device 60 so as to have a procession of steps of judging whether the acoustic signals S1–S4 received via the microphones M1–M4 are a user voice which has been registered in the memory of the sound recognition device 60.

In this case, the sound which is registered in order to identify the user may be a user's call of a name of the animal-like operating toy, or the sound of applause or shouting sound.

In the case that the input sound is a user's voice in the result of judgment, the counters 4144 in the acoustic generation position detector 10 and the RAM 74 storing the counted values are initialized prior to measuring an angle θ and a distance R with respect to the point in place where the user is located, that is, the sound source (S140).

Thereafter, the counters 41–44 are set so as to be interrupted (S150). The angle θ and the distance R with respect to the user are measured by the acoustic generation position detector 10 based on the received acoustic signals S1–S4 and the measured data is stored in the RAM 74, and it is judged whether a user command recognition with respect to the received acoustic signals S1–S4 is completed by the sound recognition device 60 (S160). In the case that the recognition is completed, the counters are set so as to not be interrupted (S170).

Thereafter, a number of angles θ and distances R stored in the RAM 74 are averaged to thereby calculate an average value, which enhances reliability of the obtained data (S180).

Then, it is judged whether a user command recognized in step S160 is an imperative sentence "Come here!" If the user's command is the imperative sentence "Come here!," the CPU 70 generates a control signal to the traveling control device 90 to shift toward the direction of the sound source.

In this case, the traveling control device 90 rotates by the average angle θ and assumes a posture by driving the pair of electric motors 92 in reverse direction so that the front face of the automobile traveling toy 100 faces the user (S191).

Figure 9:
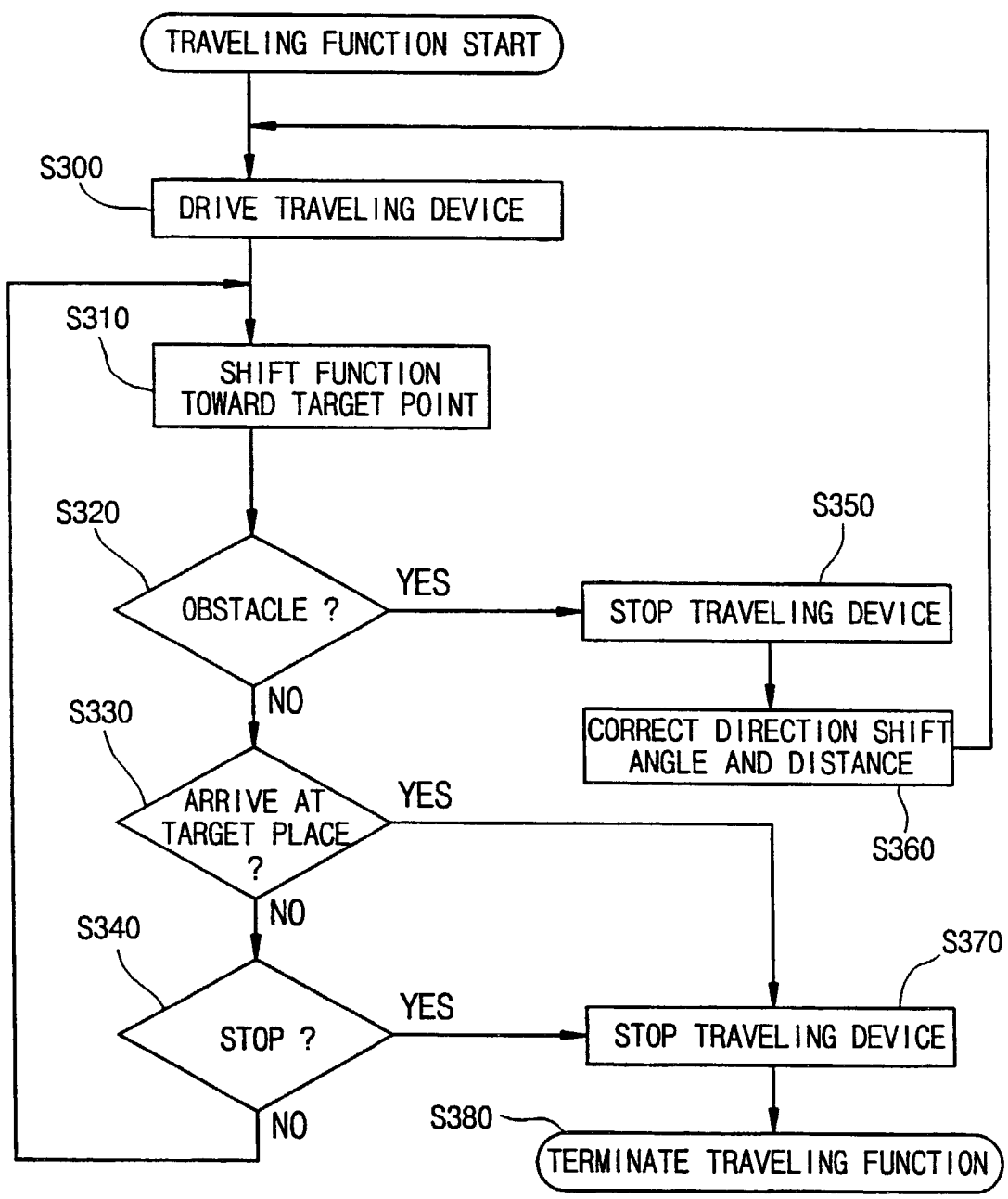
FIG. 9 is a flowchart showing a sub-routine with respect to a traveling function.

Then, according to steps as illustrated in FIG. 9 in detail which will be described later, a traveling function is performed by the distance R and the operating toy arrives at a target place where the user is positioned, to then stop driving of the electric motor 92 (S192).

Thereafter, if the animal-like toy is a puppy, the CPU 7-sends a control signal to the operation driver 98, to thereby drive an action motor 118 to make the puppy sway its tail for a predetermined time (S193).

Meanwhile, if the recognized command is not the sentence "Come here!," it is judged whether the command is a sentence "Get out of here!" (S200). If the recognized command is "Get out of here!," the CPU 70 activates the sound generator 94 to generate a sound of puppy's cry through the speaker 96 according to sound synthesis (S201).

Then, the CPU 70 generates a control signal to the traveling control device 90 so as to shift a posture in the opposite direction of the sound source (the user). In this case, the traveling control device 90 assumes a stance by driving the pair of electric motors 92 in the reverse direction so as to make the rear face of the automobile traveling toy 100 direct to the user based on rotation of the average angle θ (S202).

Then, if a reverse traveling function is performed by the distance R as in step S192, to thereby arrive at a target place, the electric motor 92 is stopped (S203).

Meanwhile, if the recognized command is not the sentence "Get out of here!" in the result of judgment of step S200, it is judged whether the recognized command an imperative sentence "Turn!" (S210). If the recognized command is "Turn!," the CPU 70 generates a one-rotational control signal to the traveling control device 90. In this case, the traveling control device 90 drives the pair of electric motors 92 in the reverse direction to thereby rotate once (S211).

Then, the CPU 70 sends a control signal to the operation driver 98 to thereby drive the action motor 118 to make the puppy sway its tail for a predetermined time (S212).

Meanwhile, if the recognized command is not the sentence "Turn!," it is judged whether the command is a name of the animal-like toy "Jindol!" (S220). If the recognized command is "Jindol!," the CPU 70 activates the sound generator 94 to generate a bowwow sound through the speaker 96 according to sound synthesis (S201), to express its gladness with respect to its owner (S221).

Then, the CPU 70 generates a control signal to the traveling control device 90 so as to shift a posture in the direction of the user. In this case, the traveling control device 90 assumes a stance by driving the pair of electric motors 92 in the reverse direction so as to make the front face of the automobile traveling toy 100 direct to the user based on rotation of the average angle θ (S222).

Then, the CPU 70 sends a control signal to the operation driver 98 to thereby drive the action motor 118 to make the puppy sway its tail for a predetermined time (S212).

Finally, if the sound recognition with respect to the received acoustic signals S1–S4 is not possible, the sound generator 94 operates for a predetermined time, to output a bowwow sound through the speaker 96 (S230).

The above various operations have been described with respect to a puppy. However, the present invention can be applied to a robot operating toy which moves using two legs. It is also possible to function as various automobiles or tanks according to the kind of the recognized command. For example, in the case that the result of the sound recognition is a sentence "Burglar!," a siren sound corresponding to an emergency move of a police car is generated via the sound generator 94 and the speaker 96, and simultaneously the warning lamp 114 is flashed by the operation driver 98, while the toy travels to the position of the sound source.

In similar fashion, in the case that the sound recognition results in "911" or "attack warning notice," an action appropriate for the situation is taken, for example, a guiding message such as a sentence "Escape!" stored in the memory 72 is generated through the speaker 96. In the case that the toy is a tank, a synthesized sound such as tank noise is generated during traveling, and at the same time bullets can be triggered toward the point in place where the sound is generated.

Also, in the case that an operating toy according to the present invention is used for children, the operating toy can be set in such a manner that it travels at a predetermined velocity toward the direction opposite to the place from which a sound is heard. Accordingly, the operating toy can operate as an intelligent toy so that a kid gives chase to the operating toy which runs away. Such an operating toy can help kids enhance their sense of motion.

Meanwhile, the process of a sub-routine S192 with respect to a traveling function will be described in detail with reference to FIG. 9.

If a traveling function starts, a pair of electric motors 92 rotate in the mutually opposite direction by the driving of the traveling control device 90. Accordingly, the direction is shifted by an angle θ which is stored in the RAM 74 (S310).

Then, when the pair of electric motors 92 are rotated forward at the same speed, the operating toy moves straight-forward to a target point. In the case that an obstacle is found by the obstacle detector 80 during going straightforward, the CPU 70 stops the driving of the electric motors 92 and controls the operating toy to shift its direction, in the same manner as the above method. At the same time, through steps S320, S350 and S360, an angle θ and a distance R with respect to the target point are corrected to then proceed to step S300.

Also, if an obstacle is detected at the state where the operating toy goes straightforward by the distance R and reaches the target point, the CPU 70 judges that the operating toy has reached the user and stops the driving of the electric motors 92 to terminate the traveling (S330, S370 and S380).

However, if a new command is received during going straightforward and the received command is a stop command in the result of recognition of the new command, the driving of the traveling electric motors 92 are stopped to terminate the traveling (S340, S370 and S380).

The operating toy 100 recognizes the acoustic generation position using the sound telemetry system and recognizes the user command by the sound recognition device 60, to thereby realize an intelligent and interactive function capable of tracking the user call and performing various command operations.

The present invention requires three microphones in order to implement the telemetry system in the case of the range of 180 degrees or less on the two-dimensional plane. Also, the present invention uses four microphones in order to implement measurement over all directions of 360 degrees. Further, the present invention uses six or more microphones which are installed in perpendicular to one another in order to perform measurement in the three-dimensional space.

Also, the present invention requires the number of channels in correspondence to the number of microphones. The circuit forming the channel can be integrated in a gate array as a single chip.

As described above, the present invention calculates a phase difference for every pulse from an acoustic signal received via three or four sensors which are arranged in the shape of a tetragon in the two-dimensional space or six acoustic receivers which are arranged in a symmetrical tetrahedron in the three-dimensional space, to measure a distance and angle with respect to a sound source in a broad direction, at high speed in real time, and errors of the measured distance and angle are corrected by arithmetically averaging the measured values, to thereby obtain an accurate position of the sound source.

Further, the operating toy of the present invention recognizes the acoustic generation position using the sound telemetry system and recognizes the user command by the sound recognition chip, to thereby realize an intelligent and interactive function capable of tracking the user call and performing various command operations.

INDUSTRIAL APPLICABILITY

Thus, the present invention can be applied to the passive sound telemetry system and the operating toy using the same for measuring the angle and distance with respect to the sound generation source.

Meanwhile, the above embodiment has been described with respect to the case that the sound telemetry system is applied to the operating toy. However, the present invention system can be applied as a sensor for remotely measuring the point in generation of an explosive sound or a security warning sensor using the output of a level trigger circuit. Also, using microphones arranged in a plurality of spots such as a factory or an office, the present invention can be used as a sensor for identifying the place where an invader or invaders trespass very accurately by signal-processing the output of the measuring system and detecting to which spot a sound is received in the earliest way, at a central control room when an invasion occurs from outside at night. As such, the telemetry system according to the present invention can applied to various automation equipment for military, industrial or home use.

The invention claimed is:

1. A passive sound telemetry system for measuring an angle θ and a distance R with respect to an acoustic generation source, the passive sound telemetry system comprising:

first through third acoustic receivers disposed at three of four vertices of a square each side of which has a predetermined length L, for receiving first through third acoustic signals having an arrival time difference from the acoustic generation source, the predetermined length of the acoustic receivers being set to be within a wavelength of a sound being measured;

first through third low-pass filters respectively coupled to the first through third acoustic receivers for amplifying the corresponding first through third acoustic signals and filtering noise and high frequency signals therefrom having a frequency greater than an audible frequency;

first through third zero crossing detectors respectively coupled to the first through third low-pass filters for converting the first through third acoustic signals into a pulse signal for every period based on a zero electrical potential, to thereby generate first through third pulse signals;

earliest reception signal detector means coupled to the first through third zero crossing detectors for detecting a pulse signal having the earliest phase among the first through third pulse signals;

first through third arrival time difference calculator means coupled to the earliest reception signal detector means for calculating an arrival time difference between the pulse signal of the earliest phase and the first through third pulse signal, respectively; and a signal processor coupled to the first through third arrival time difference calculator means for reading the first through third arrival time differences generated from the first through third arrival time difference calculator means in response to a counting end signal of the arrival time difference calculator means, and obtaining an angle and distance between a center of the square having first through third acoustic receivers at vertices thereof and the acoustic generation source, based on the second minimum arrival time difference value and the third minimum arrival time difference value.

2. A passive sound telemetry system for measuring an angle θ and a distance R with respect to an acoustic generation source, the passive sound telemetry system comprising:

first through fourth acoustic receivers disposed in each vertex of a square each side of which has a predetermined length L, for receiving first through fourth acoustic signals having an arrival time difference from the acoustic generation source;

first through fourth zero crossing detectors for converting the first through fourth acoustic signals into a pulse signal for every period based on a zero electrical potential, to thereby generate first through fourth pulse signals;

earliest reception signal detector means for detecting a pulse signal having the earliest phase among the first through fourth pulse signals; and first through fourth arrival time difference calculator means for calculating first through fourth arrival time differences between the pulse signal of the earliest phase and the first through fourth pulse signal, respectively, to thereby obtain an angle and distance between the center of the first through fourth acoustic receivers and the acoustic generation source, based on the second minimum arrival time difference value and the third minimum arrival time difference value.

3. The passive sound telemetry system according to claim 2, further comprising fifth and sixth acoustic receivers which are disposed in the upper and lower vertices forming the upper and lower symmetrical tetrahedron including the first through fourth acoustic receivers;

fifth and sixth zero crossing detectors for converting the fifth and sixth acoustic signals into a pulse signal based on the zero electric potential for every period, to thereby generate fifth and sixth pulse signals; and fifth and sixth arrival time difference calculators for obtaining arrival time differences and between the pulse signal having the earliest phase and the fifth and sixth pulse signals.

4. The passive sound telemetry system according to claim 3, wherein an angle θz with respect to the acoustic generation source from a center of the first through sixth receivers is obtained by the following equation:

$$\theta_z = \sin^{-1}\frac{c(t_5 - t_4)}{\sqrt{2}L}$$

where c is the velocity of the sound waves, $t_4$ is an arrival time difference between the pulse signal having the earliest phase and the pulse signal output from the fifth zero crossing detector, and $t_5$ is an arrival time difference between the pulse signal having the earliest phase and the pulse signal output from the sixth zero crossing detector, and the actual distance D in the three-dimensional space can be obtained by the following equation, using the distance R up to the acoustic generation source on the plane including the center:

$$D = \frac{R}{(\cos\theta_z)}.$$

5. A passive sound telemetry method for measuring an angle θ and a distance R with respect to an acoustic generation source, the passive sound telemetry method comprising the steps of:
receiving first through fourth acoustic signals having an arrival time difference from the acoustic generation source by first through fourth acoustic receivers disposed in each vertex of a square each side of which has a predetermined length L;
converting the first through fourth acoustic signals into a pulse signal for every period based on a zero electrical potential, to thereby generate first through fourth pulse signals;
detecting a pulse signal having the earliest phase among the first through fourth pulse signals;
calculating first through fourth pulse arrival time differences between the pulse signal of the earliest phase and the first through fourth pulse signal, respectively; and
obtaining an angle and distance between a center of the first through fourth acoustic receivers and the acoustic generation source, based on a time difference between the second minimum arrival time difference value and the third minimum arrival time difference value.

6. The passive sound telemetry method according to claim 5, wherein the angle θ is obtained by the following equation when c is the velocity of the sound wave:

$$\theta = \sin^{-1}\frac{c(t_2 - t_0)}{\sqrt{2}L} + 45°$$

where c is the velocity of the sound waves, $t_0$ is an arrival time difference between the pulse signal having the earliest phase and the pulse signal output from the first zero crossing detector, $t_1$ is an arrival time difference between the pulse signal having the earliest phase and the pulse signal output from the second zero crossing detector, and the distance R is obtained by the following equation:

$$R = \frac{L\sin(\theta_0 + 90°)}{2\sin(90° - \theta_0 - \theta)}$$

in which $$\theta_0 = \cos^{-1}\frac{c(t_0 - t_1)}{L}$$

7. A passive sound telemetry system for measuring an angle and a distance with respect to an acoustic generation source, the passive sound telemetry system comprising:
a plurality of acoustic receivers spaced one from another a predetermined length for receiving a plurality acoustic signals having an arrival time difference from the acoustic generation source, the predetermined length being set to be within a wavelength of a sound wave to be measured;
a plurality of low-pass filters respectively coupled to the plurality of acoustic receivers for amplifying the corresponding plurality of acoustic signals and filtering noise and high frequency signals therefrom having a frequency greater than an audible frequency;
earliest reception signal detector means coupled to the plurality of low-pass filters for detecting an acoustic signal having an earliest phase among a plurality of pulse signals corresponding to the plurality of filtered acoustic signals; and
a plurality of signal processing channels which are respectively connected in series with the acoustic receivers for calculating a plurality of arrival time differences between the acoustic signal of the earliest phase and the plurality of a remaining portion of the plurality of acoustic signals, to thereby obtain an angle and distance between a center of the plurality of acoustic receivers and the acoustic generation source, based on the second minimum arrival time difference value and the third minimum arrival time difference value.

8. The passive sound telemetry system according to claim 7, wherein the signal processing channels each comprise:
a zero crossing detector for converting the acoustic signal into a pulse signal based on a zero electric potential for every period; and
an arrival time difference calculator for calculating an arrival time difference between the pulse signal of the earliest phase and the pulse signal.

9. A user interactive operating toy using a passive sound telemetry system, the user interactive operating toy comprising:
an electric-powered driving mechanism having a directional conversion and traveling function by means of at least a pair of individually driven electric motors;
a housing which moves by the electric-powered driving mechanism;
a plurality of visually, aurally and physically driven portions which are installed in the exterior of the housing and operate by a control signal;
first through fourth acoustic receivers contained in the housing and disposed in each vertex of a square each side of which has a predetermined length L, for receiving first through fourth acoustic signals having an arrival time difference and generated from a user;
first through fourth zero crossing detectors for converting the first through fourth acoustic signals into a pulse signal for every period based on a zero electrical potential, to thereby generate first through fourth pulse signals;

earliest reception signal detector means for detecting a pulse signal having the earliest phase among the first through fourth pulse signals;

first through fourth arrival time difference calculator means for calculating first through fourth arrival time difference between the pulse signal of the earliest phase and the first through fourth pulse signals, respectively; and a controller for controlling the electric-powered driving mechanism by obtaining an angle $\theta$ and a distance R between a center of the first through fourth acoustic receivers and the user, based on the second minimum arrival time difference value and the third minimum arrival time difference value, and following a user command based on a sound recognition using the obtained angle $\theta$ and distance R.

10. The user interactive operating toy according to claim 9, further comprising:

sound recognition means for performing sound recognition with respect to the first through fourth sound signals;

a sound pattern memory for registering a particular sound pattern of the user; and a sound judgment unit for judging whether the received sound signal is a prestored particular sound signal, wherein said controller which is activated only when the prestored particular sound signal is received and tracks the user instruction command according to the sound recognition.

11. The user interactive operating toy according to claim 9, wherein said controller comprises:

a programmable memory for storing a system controlling program, various variables, various melody or animal sound or cry;

a data memory for storing temporary data under progress; and a sound generator for synthesizing the sound data stored in the programmable memory so that any of the melody, animal sound or cry can be generated in response to the user particular command.

* * * * *